United States Patent
Said et al.

(10) Patent No.: US 11,733,907 B2
(45) Date of Patent: Aug. 22, 2023

(54) OPTIMIZE RECOVERY TIME OBJECTIVE AND COSTS OF CLOUD BASED RECOVERY

(71) Applicant: EMC IP Holding Company LLC, Hopkinton, MA (US)

(72) Inventors: Jawad Said, Kfar Yasif (IL); Saar Cohen, Moshav Mishmeret (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/985,348

(22) Filed: Aug. 5, 2020

(65) Prior Publication Data

US 2022/0043572 A1  Feb. 10, 2022

(51) Int. Cl.
*G06F 3/06* (2006.01)
*H04L 67/1095* (2022.01)

(52) U.S. Cl.
CPC .............. *G06F 3/065* (2013.01); *G06F 3/067* (2013.01); *G06F 3/0619* (2013.01); *G06F 3/0659* (2013.01); *H04L 67/1095* (2013.01)

(58) Field of Classification Search
CPC ...... G06F 3/065; G06F 3/0619; G06F 3/0659; G06F 3/067
See application file for complete search history.

(56) References Cited

U.S. PATENT DOCUMENTS

| | | | |
|---|---|---|---|
| 9,563,517 B1 | 2/2017 | Natanzon et al. | |
| 10,452,453 B1 * | 10/2019 | Kumar | G06F 3/0647 |
| 11,086,545 B1 * | 8/2021 | Dayal | G06F 3/065 |
| 2008/0256545 A1 * | 10/2008 | Akidau | G06F 9/466 |
| | | | 718/104 |
| 2012/0110287 A1 * | 5/2012 | Han | G06F 11/1451 |
| | | | 711/E12.001 |
| 2014/0052691 A1 | 2/2014 | Sasson et al. | |
| 2020/0201826 A1 | 6/2020 | Raju et al. | |

OTHER PUBLICATIONS

Extended European Search Report received for EP Patent Application No. 21190009.7, dated Jan. 17, 2022, 7 pages.

\* cited by examiner

*Primary Examiner* — Arpan P. Savla
*Assistant Examiner* — Eric T Loonan
(74) *Attorney, Agent, or Firm* — Workman Nydegger

(57) ABSTRACT

Disaster recovery operations are disclosed. A copy of data may include segments and delta journals or journals. RTO can be reduced by pre-processing the delta journals after the segments and delta journals are uploaded. The RTO is improved during recovery because the need to process the delta journals is eliminated. Applying the delta journals can be performed to both reduce cost and RTO using graphs.

20 Claims, 10 Drawing Sheets

OPTIMIZE RECOVERY TIME OBJECTIVE AND COSTS OF CLOUD BASED RECOVERY

FIELD OF THE INVENTION

Embodiments of the present invention generally relate to data protection and data protection operations. More particularly, at least some embodiments of the invention relate to systems, hardware, software, computer-readable media, and methods for data protection operations including backup operations, replication operations, and disaster recovery operations.

BACKGROUND

Data protection operations are an important aspect of computing systems today. Failing to protect data can have catastrophic effects. Unsurprisingly, most entities ensure that their data is protected. Some data protection schemes, however, are better than others. For example, the ability to recover from a disaster may be measured in terms of how long it takes to recover the data. The RTO (recovery time objective) is an important measurement of the data protection system.

At the same time, it is often necessary to consider the cost of the data protection system. A system that provides extremely low RTO, for example, may incur an unacceptable cost. When storing backups in the cloud, for example, there are costs that may be incurred in many different ways. Costs are often imposed in terms of storage, CPU, processor cores, and others.

One of the problems that leads to higher costs is the fact that data is often stored unnecessarily. In addition, when the data is needed, there are costs associated with processing the data that is not necessarily needed. There is a need to reduce the work and data transfer associated with data protection operations (e.g., recovery operations) and a need to reduce costs while still maintaining an acceptable RTO.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
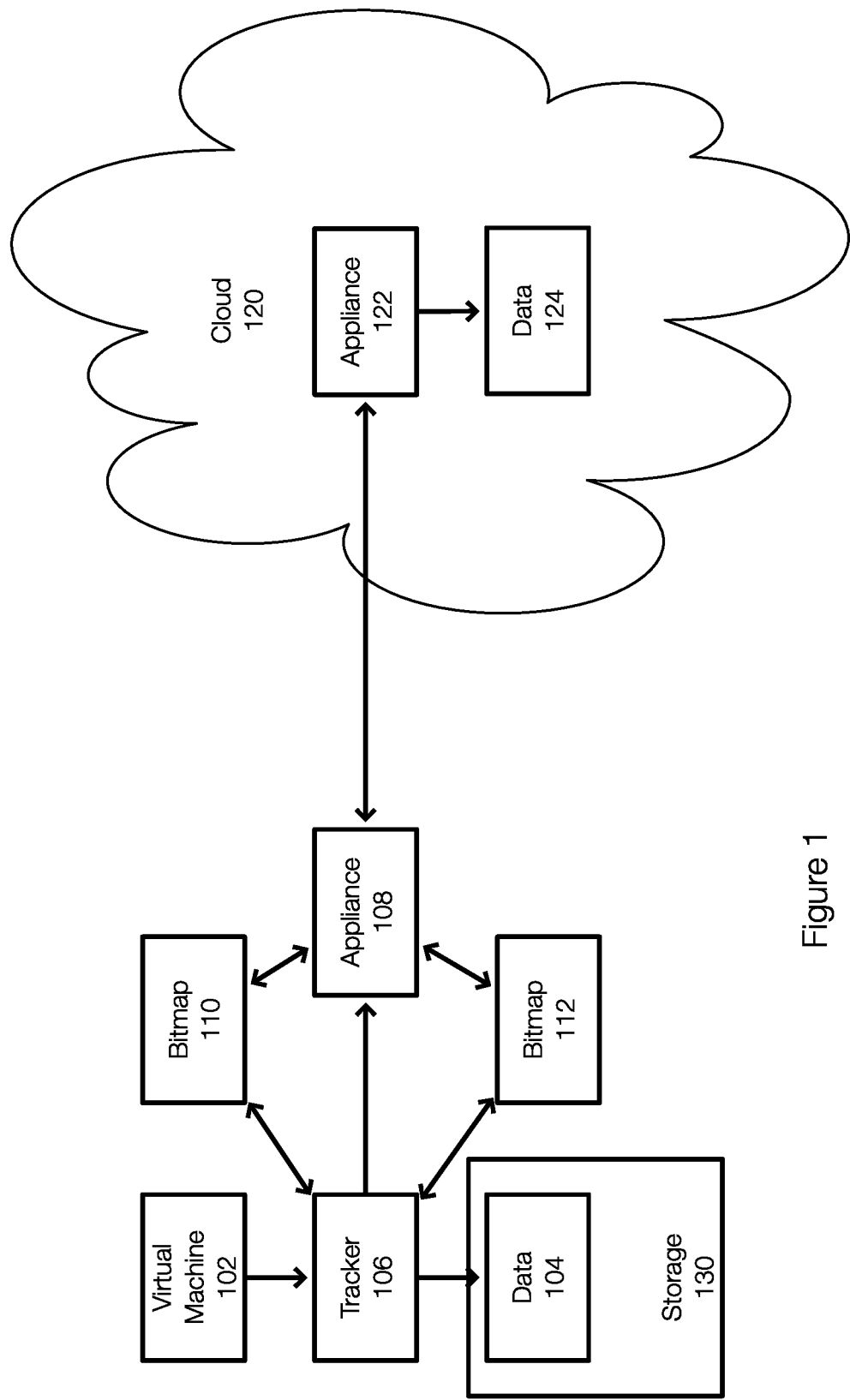
FIG. 1 illustrates an example of a computing environment in which embodiments of the invention are implemented.

Embodiments of the present invention generally relate to data protection and data protection operations. More particularly, at least some embodiments of the invention relate to systems, hardware, software, computer-readable media, and methods for data protection operations such as backup operations, replication operations, recovery operations including disaster recovery operations, cost optimization operations, snapshot operations, journal operations, merge operations, or the like or combination thereof.

Data protection can be provided for various computing systems including systems that include virtual machines and that use virtualization in datacenters. RTO is often used to describe the recovery time and it is desirable to have the RTO be as short as possible. Generally, the RTO is the maximum acceptable amount of time for restoring a virtual machine or for restoring an application and regaining access to data after an unplanned disruption.

In a data protection services such as DRaaS (Disaster Recover as a Service or Cloud object store disaster recovery), recovery is performed to recover a backup to a target VM. During recovery, a restore VM will create the target VM and provide the target VM with disks of proper sizes. Then the restore VM will download all the full segments in sequence and write the segments to the relevant disks. A delta journal is then downloaded and written to the disks of the target VM. Writing the delta journal may overwrite data that was previously written when writing the segments to the disks. Embodiments of the invention advantageously eliminate this aspect of a recovery operation.

Embodiments of the invention relate to protecting virtual machines and replicating virtual machines to the cloud (e.g., Amazon S3). Embodiments of the invention further relate to disaster recovery in the cloud. Embodiments of the invention may be implemented, by way of example and not limitation, as DRaaS or in VMC (VMware Cloud in AWS) or Dell CloudDR.

Data may be protected using replication or snapshot operations. An example replication includes vSphere Replication that uses a protocol known as LWD (Light Weight Delta) to replicate a point-in-time image of a disk without using full snapshots. When an LWD snapshot is generated, the snapshot data is transmitted to a component called SDM (Snapshot Data Mover) which exists both on-premise and in the cloud. SDM on-premise sends the data to SDM in the cloud which will persist the data in object storage (e.g., S3) and create a descriptor file which will describe the copy.

Embodiments of the invention may be implemented or incorporated into LWD replication. The SDM and/or other components is one example of a data protection appliance (virtual or physical).

The following discussion refers to segments or segments of data and chunks. Segments may refer to data that has a fixed size. Chunks may refer to data that is not necessarily fixed.

When generating a snapshot (e.g., an LWD snapshot), the appliance receives segments of data and then receives delta journals that contain chunks of data. Delta journals, by way of example, are generally a journal of IOs (write 10s) that arrives during the data protection operation (e.g., backing up to the cloud, replicating to the cloud, etc.). In order to perform a recovery operation or to prepare for a recovery operation, The appliance (e.g., SDM in the cloud) processes the data sent in the first phase (the data segments), and then handles the journal (e.g., delta journals), which contains chunks. This procedure makes the recovery process more complex, adds latency and increases the RTO (Recovery Time Objective) of the VMs being protected.

Embodiments of the invention relate to the efficient consolidation of delta journals with the device data or segments during the protection operations. This reduces the amount of processing and data transfer needed during the recovery operation and reduces RTO.

Embodiments of the invention perform data protection operations without requiring virtual machines to pause their activity (which impacts performance) for a short time period. Embodiments of the invention allow a point-in-time image of a device (e.g., a volume, a virtual machine, an application/data, a consistency group, or other configuration) to be protected without resorting to a full snapshot mechanism or quiescing the virtual machine.

FIG. 1 illustrates an example of a data protection system that performs data protection operations in a computing environment. FIG. 1 illustrates an appliance 108 (e.g., an on-premise appliance) that communicates with an appliance 122 (e.g., cloud-based or operated). The appliances 108 and 122 may be implemented as physical devices, virtual devices, or the like. The appliance 108 may be associated with a production site or production VMs.

In FIG. 1, the appliance 108 is associated with a tracker 106, which may also be part of the data protection system. The tracker 106 is positioned in an 10 path (e.g., in a kernel or in a hypervisor layer) between a virtual machine 102 and data 104 stored on a storage 130. The tracker 106 can intercept any 10 from the virtual machine 102 and send or replicate the 10 to the appliance 108.

More specifically, the tracker 106 (and/or the appliance 108) may track the changes to the data 104 with respect to a previous point-in-time such as a previous snapshot. The changes to the data 104 are tracked, in one example, using bitmaps. Each time a snapshot is generated, a new bitmap is created to track changes subsequent to the point in time of the snapshot. The old or previous bitmap is used to identify dirty regions (regions that have changed since the previous backup or snapshot) of the storage 130. Each time a snapshot or backup is performed, in one example, the current bitmap becomes the old bitmap and a new bitmap is generated to track subsequent changes to the storage 130 or to the data 104.

Thus, changes to the data 104 are tracked in a bitmap. Each entry in the bitmap may correspond to a region of the storage 130 and may have a fixed size. For example, each entry in the bitmap may correspond to a 64 KB disk segment or 64 KB data segment. Other segment sizes could be used in embodiments of the invention.

When a snapshot is taken of the virtual machine 102 and/or data 104 or of volumes of the virtual machine 102, the data protection system generates the snapshot.

This example assumes that some of processes are performed by or controlled by the tracker 106 and/or the appliance 108, at least on the on-premise or production site. These processes can be performed by any combination of the tracker 106 and/or the appliance 108.

Initially, the tracker 106 opens or creates a new bitmap 112 that is initially empty when a snapshot is triggered. At the time of the snapshot, the old bitmap (the bitmap 110) is closed and the bitmap 110 identifies regions or segments of data that have changed since a previous snapshot. The following discussion will refer to the data corresponding to the dirty bits as segments. In some examples, the segments and chunks in the delta journals are examples of objects.

After the bitmaps are ready for processing, the bitmap 110 is synchronized. Synchronizing the bitmap 110 includes reading segments from the data 104 that corresponds to the dirty bits in the bitmap 110. For each bit that is set in the old bitmap 110 (the dirty bits), the tracker 106 may read the corresponding segments in the data 104, which is stored on the storage device 130. The segments may be read by the appliance 108 and the segments read based on dirty bits in the bitmap 110 are transferred to the appliance 122 and stored with the data 124, which is stored in cloud storage devices.

As the segments corresponding to the set or dirty bits in the bitmap 110 are read, a new IO may arrive from the virtual machine 102. When a new IO arrives, the tracker 106 causes a corresponding bit in the bitmap 112 to be set. The new bitmap 112 will be used for the next snapshot. If the new IO is directed to a segment that has not yet been synchronized (e.g., read by the appliance 108 and/or transferred to the appliance 122), the chunk (or portion of the disk or data) corresponding the new IO is read and stored in a journal, also referred to herein as a delta journal. This action is only performed for the first IO sent to that segment during the synchronization or snapshot process.

By preserving the chunk before committing the new IO to the data 104, the chunk can be used to overwrite the segment once that segment is synchronized. This ensures that the segment or the segment data, as the segment or segment data existed at the time the snapshot was taken is preserved or protected.

After the chunk has been stored in the delta journal, the new IO is then written to the data 104 on the storage 130. The segment is overwritten with the new IO. Because the chunk may be a different size than the segments represented in the bitmap, a chunk may impact one or more segments or entries in the bitmap. If the new IO is a chunk that is larger than a segment, multiple bits may be set to cover the chunk. When the synchronization process reaches a segment that has been overwritten (at least partially) with a new IO, the segment may still be copied and transferred to the appliance 122. As discussed in more detail below, this segment is ultimately replaced with the chunk in the delta journal in order to recover the segment as it existed at the time the snapshot was taken.

Thus, the initial synchronization of the segments associated with the dirty bits in the bitmap 110 has been performed. This synchronization may include transmitting the segments to the appliance 122. In a second phase, the entire contents of the delta journal (or delta journals) are provided to or accessed by the appliance 108. The delta journals may be stored by the appliance. The appliance 108 sends the delta journal(s) to the appliance 122 for storage with the data 124.

In one example, the appliance 108 may be configured to collect data and efficiently transfer data to the appliance 122, for example in large batches. Thus, the segments and delta journal may be organized at the appliance 108 such that the segments and delta journal can be transmitted more efficiently.

In the cloud 120, the data may be received in two phases. The first stage includes receiving the segments corresponding to the dirty bits in the bitmap 110. The second stage corresponds to receiving the delta journal. These two stages or phases are performed in generating a single backup or snapshot in one example. Because the snapshot may be an incremental snapshot, the other segments corresponding to the snapshot already exist in the cloud 120.

More specifically, the segments transmitted to the appliance 122 or to the cloud 120 are the result of processing the dirty bits in the bitmap 110. In one example, the segments read during the first phase are regions of a fixed size. This size depends, in one example, on the size of the regions represented by each bit in the bitmap 110. For example, if each bit in the bitmap 110 marks a 64K region, each segment sent in the first stage or phase will be a full 64 KB of data. Other segment sizes are possible.

In addition, the data is transmitted in an ordered form. In other words, the offsets of the segments determines the order in which the segments are transmitted to the appliance 122. This may facilitate writing and recovery operations because the segments can be written sequentially.

The data in the delta journal, which are referred to herein as chunks in order to distinguish them from the segments, may have different sizes at least because the chunks correspond to new IOs that were directed to the storage 130. For example and assuming a segment size of 64 KB, if a 4 KB IO arrives, the tracker 106 or the appliance 108 reads the relevant 4 KB chunk from the storage 130 and stores the 4 KB chunk in the delta journal. In one embodiment and by way of example only, because the bitmap resolution is 64 KB in this example, 64K may be read rather than the 4 KB chunk. When using a bitmap to track dirty segments, the resolution of the bitmap thus identifies segments or, in this example, that 64K needs to be backed up. In an example where there are two 4 KB IOs to the same segment, without additional overhead, whether the segment was already read into the delta journal is not known. As a result, reading the whole segment allows all partial IOs (in terms of segment size) to be protected. In one example, the chunk size may be smaller than the resolution of the bitmap (the segments). Using the foregoing example where the segments and bitmap resolution if 64 KB, a 4 KB comes in and the whole 64 KB of undo data is read—not just the 4 KB in one example. In one example, the tracking of areas that the undo info was already read is in segment (64 KB in this example) resolution. Therefore, all undo chunks read can be read in multiples of 64K and aligned. If 4 KB is written to offset 140K, it is necessary to read 64 KB from offset 128 K to 196 K. The delta journal may include delta journal packages of predetermined size. Thus, the delta journal may contain multiple delta journal packages. Each package may aggregate many chunks.

In addition, the chunks within each delta journal are placed in the delta journal in the order in which they arrived. For example, it is possible to have an IO directed to the beginning of the disk immediately followed by an IO directed to the end of the disk. The order of chunks in the delta journal is effectively determined by the original workload that generates the IOs. The appliance 122, which is at the target site or on the cloud side, writes the delta journal into object storage (e.g., AWS S3) after receiving the delta journal.

Figure 2:
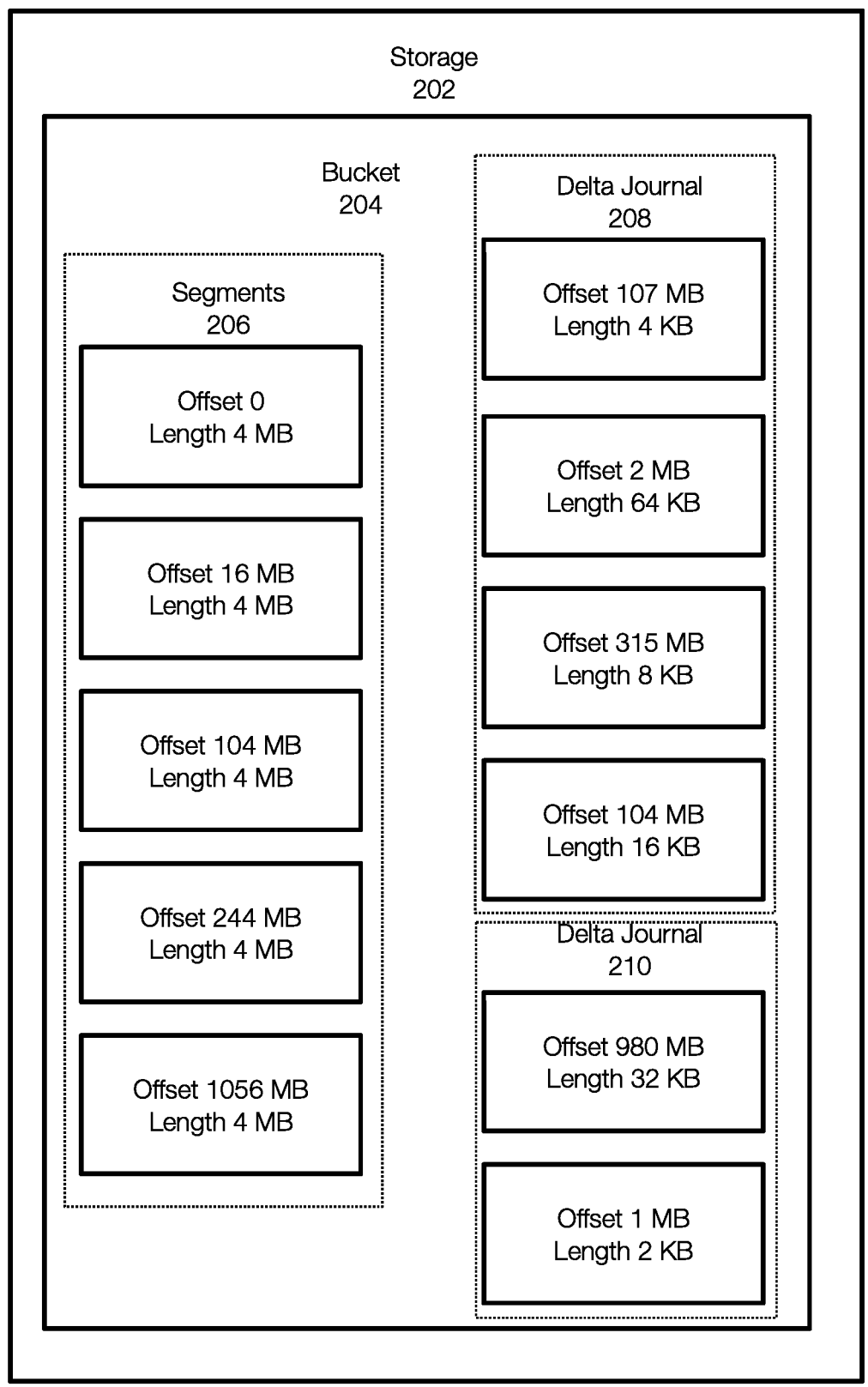
FIG. 2 illustrates an example of a backup, which may include segments and delta journals.

FIG. 2 illustrates an example of how the segments and delta journal corresponding to the snapshot operation may be stored in cloud storage. FIG. 2 illustrates a storage 202 (e.g., object storage) that includes a bucket 204. The segments 206 received during the first phase are stored in an ordered form. As illustrated in FIG. 2, the segments 206, which correspond to the data associated with at least some of the dirty bits, are written in order and have a predetermined size. Each of the segments 206, in FIG. 2 and by way of example only has a size of 4 MB and the offsets are ordered.

In this example, the delta journal may have includes more than one package. The delta journal packages in the delta journal are illustrated as delta journal 208 and delta journal 210. The delta journal 208 illustrates that the chunks in the delta journal 208 do not have a fixed size and are not ordered other than perhaps with respect to the order in which the chunks were received or written by the VM. The chunks in the delta journals 208 and 210, however, are not ordered with respect to offset and do not have a specific size.

FIG. 2 illustrates an example of a snapshot or backup that was generated from the virtual machine 102 or from the production site. In some examples, the delta journals may also contain objects with metadata. In this example and for ease of explanation, the objects in the delta journal start on a MB boundary. However, a write may start on any arbitrary block boundary.

In preparation for a recovery operation, embodiments of the invention perform processing (or preprocessing with respect to a later in time recovery operation) to essentially incorporate the delta journals into the segments. This allows the virtual machine to be recovered by writing the segments and avoids, during recovery, time and cost associated with handling the delta journals.

For contrast, an example of a recovery operation without pre-processing is described. To perform a recovery operation to a specific point in time, the data protection system (e.g., the appliance 122 in FIG. 1) may perform the process in stages. With respect to FIG. 2 and to recover to the point of time represented by the snapshot shown in FIG. 2, the segments 206 may be applied to the disks or volumes of a recovery VM (to hydrate the VM, it may be necessary to write the appropriate segments from another backup as the snapshot shown in FIG. 2 may be an incremental snapshot).

Next, the full delta journal (e.g., delta journals 208 and 210) are applied to overwrite the segments already written. This is performed because the delta journals contain chunks of data from the selected point-in-time while some of the segments may contain data that was written after the selected point in time. In other words, the data in some of the segments 206 may have been collected after new writes or IOs had already been applied at the production site. Applying the chunks in the delta journal allows the segments to be restored to the selected point-in-time.

For example, the segment 206 whose offset is 0 and whose size is 4 MB may not contain data that is applicable to the selected point-in-time. For example, this segment may have been synchronized after a new IO was written to the disk. Thus, to recover the actual data for the selected point in time, it is necessary to apply the chunk in the delta journal as previously discussed.

In this example, the delta journal 208 includes a chunk whose offset is 2 MB and whose length is 64 KB. The segment (or portion thereof) whose offset is 0 is overwritten with the chunk whose offset is 2 MB. The second delta journal 210 also includes a chunk whose offset is 1 MB and whose length is 2 KB. This chunk is also applied to the segment whose offset is 0. These two phases allow the selected point in time to be recovered. Storing the segments and the delta journals may cause a customer to pay for storage that is not needed. This process also may incur unnecessary compute time or CPU time. More specifically, some of the data in the segments 206 is not needed for that particular point in time. As a result, storage costs are more than necessary. Further, the direct approach of simply overwriting segments with the chunks in the delta journal adds time to the recovery process at least because of the need to download the delta journals and then apply the chunks stored in the delta journals to the target VM.

Embodiments of the invention further relate to efficiencies in this process. As previously stated, the delta journals contain chunks that are used to overwrite some of the segments or portions thereof. Although embodiments of the invention are discussed with reference to replicating data (e.g., replicating data using an LWD mechanism), embodiments of the invention can be implemented with other applications when replicating applications/data to cloud-based storage.

For example, a database that uses transactional logs can be replicated using embodiments of the invention. When replicating a database, an image of the data files of the database is available. A set of files containing transaction logs can be applied to the database itself to generate the latest point-in-time. In this example, the transaction logs are essentially overriding or used to overwrite the original data contained in the database image with data that relates to a specific point in time.

One difference is that the delta journals contain "undo" information or the data that existed before a new IO is received, while database transaction logs contain "do" information or data that is to be applied. In general, every journaling mechanism can benefit from embodiments of the invention including data protection systems, database systems, file system journaling, or the like.

Embodiments of the invention improve the storage of segments and delta journals by consolidating the delta journals into the full segments that are stored in the cloud storage. This removes the need to read the delta journal separately and apply the delta journal after the full segments are applied to the disks of the target VM. This also reduces storage consumption in the cloud such that data is not stored twice or unnecessarily.

In one example, the chunks in the delta journal can be consolidated into the full segments by traversing the delta journal and, for each chunk in the delta journal, apply the chunk to the relevant segment. While this is possible, the delta journal chunks (or objects) are not ordered. As a result, this simple approach requires reading, modifying, and writing the entire segment for each chunk in the delta journal. Because the delta journal chunks are not ordered, this process of reading, modifying, and writing a full segment occurs for each chunk in the delta journal. This can take time and may result in the same segment being read, modified, and written multiple times.

For example, the first 4MB segment in the segments 206 will be processed at least two times when processing the delta journals 208 and 210 in this manner. In addition, object storage is an eventually consistent storage. As a result, when a client reads, modifies, and writes the same segment or object several times, there is no guarantee that this process will be performed on the latest version of the segment or object.

Embodiments of the invention further relate to applying delta journals to full storage segments or objects efficiently and in a manner that is compliant with object storage.

Figure 3:
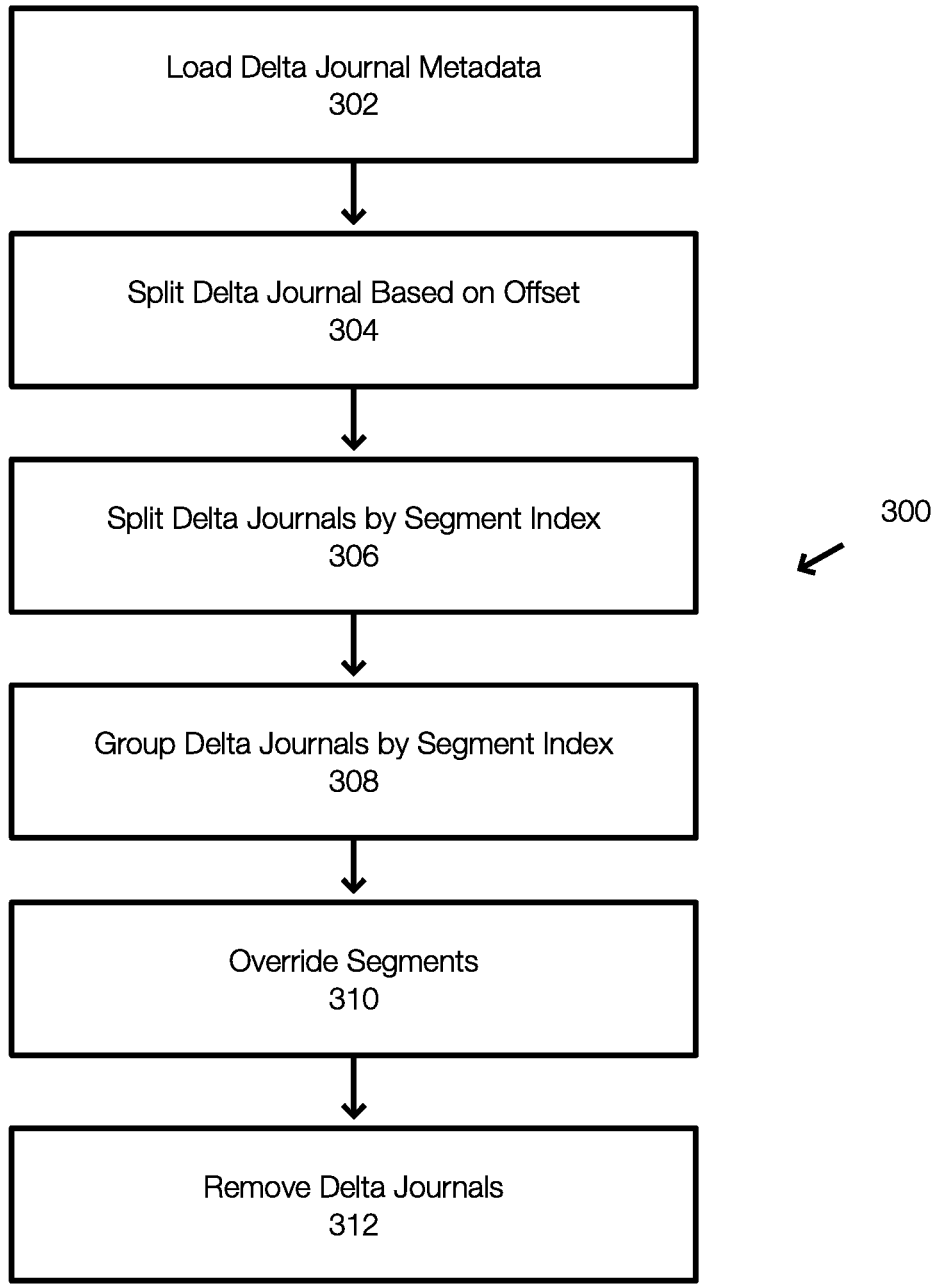
FIG. 3 illustrates an example of a method for processing the backups after the backups have been stored in the cloud.

FIG. 3 illustrates an example of a method for performing a data protection operation such as optimizing RTO and/or cloud costs. FIG. 3 is described with reference to FIG. 2. RTO can be optimized by processing the delta journals (preprocessing with respect to an potential future recovery operation). Initially, the delta journal metadata is loaded 302 or accessed. The metadata may be stored as an object in the delta journal. The metadata may include, for each segment or object, the offset and/or the length and may identify the bucket or other storage location in the cloud.

Once the delta journals are loaded, the delta journals are split 304 or grouped based on offset. For example and with reference to FIG. 2, the delta journal 208 is split into offset delta journals based on the offset of the objects or segments in the delta journal. In other words, an offset delta journal is created for each offset in the initial delta journal.

Next, the offset delta journals are split 306 or grouped based on segment index or in consideration of segment size. For example, if the offset and length for a chunk in the delta journal cover more than one segment, the offset delta journal is split or organized such that the offset delta journals correspond to segments that are related to the changed blocks. This may result in the creation of additional offset delta journals.

The offset delta journals can then be grouped 308 or organized by segment index. In other words, all of the offset delta journals associated with same segment (or same segment index (e.g., offset) can be grouped together.

For each segment index (or offset), the relevant delta journal raw data is retrieved and the segments (or portions thereof) are overwritten with the delta journal chunks as necessary. Thus, all chunks associated with the same index or segment offset are written at the same time or during the same segment access. Advantageously, this process ensures that the same index or that the same segment is not repeatedly accessed, which may occur if each chunk in the delta journal is processed separately. By grouping or organizing the chunks into the index of offset delta journals, all of the delta journal objects for a particular segment or segment index can be processed at the same time with respect to each segment. In other words, the segments are overridden 310 or overwritten with the chunks from the delta journals based on the manner in which the delta journals have been organized or split.

When overwriting the segment with the chunks or objects in the delta journal, an API may be used to overwrite the segment in the cloud using the offset and length. Alternatively, the segment can be downloaded, modified with all of the relevant chunks in the delta journals, and then uploaded back to the cloud.

Finally, the delta journals are removed 312 from cloud storage. This ensures that the storage space is not excessively consumed, which reduces storage cost.

Figure 4:
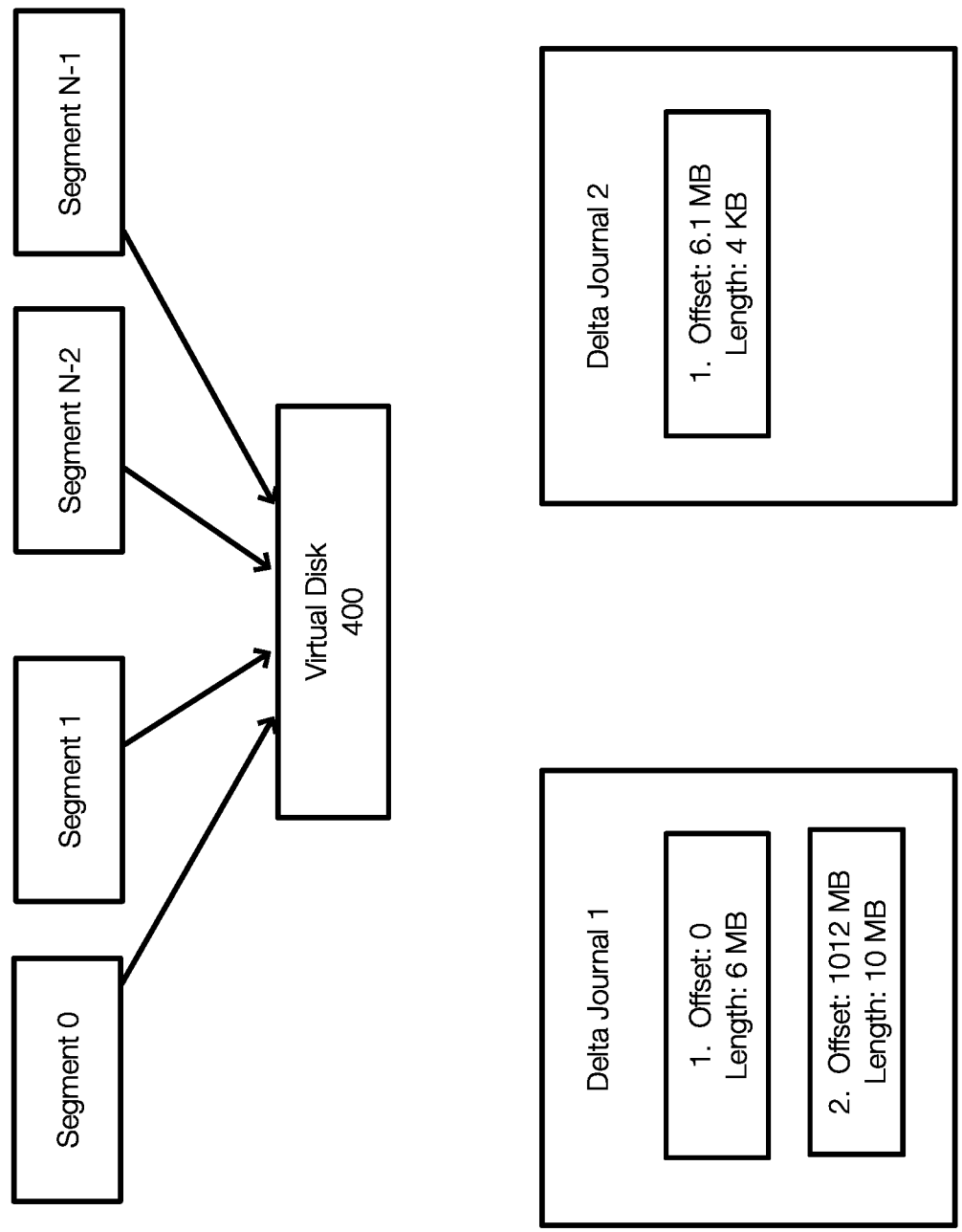
FIG. 4 illustrates an example of segments and delta journals and their relationships.

The method 300 of FIG. 3 is further illustrated with respect to FIGS. 4-7. More specifically, FIG. 4 illustrates a virtual disk 400 that has a disk size, in this example, of 1 GB. The disk is divided into 256 segments in this example. Thus, each segment has a segment size of 4 MB. The virtual disk 400 can represent the production disk and the target disk of the recovery VM.

When a snapshot is taken, the changed segments, delta journals, and metadata may be stored in the manner illustrated in FIG. 2. As a result, the number of segments included in the segments 206 depends on the number of dirty bits in the corresponding bitmap and is typically less than all of the available segments.

The changed segments and delta journals are then transmitted to and stored in the cloud.

For example, when preprocessing the backup, which may include segments and delta journals, assume that the snapshot of the virtual disk 400 includes 5 segments (segments 0, 1, 253, 254, and 255), delta journal 1, which contains 2 chunks, and delta journal 2, which contains 1 chunk. This example assumes that Segments 0, 1, N-2 and N-1 shown in FIG. 4 represent segments 0, 1, 253, 254, and 255.

Initially, the delta journal metadata is loaded or accessed. The metadata is reflected in FIG. 4, which illustrates that the delta journal 1 is associated with two chunks: chunk 1 having an offset of 0 and a length of 6 MB; and chunk 2 having an offset of 1012 MB and a length of 10 MB. The metadata of delta journal 2 illustrates that the delta journal 2 is associated with a chunk 1 having an offset of 6.1 MB and a length of 4 KB.

After the metadata is loaded, each delta journal is split or organized into offset delta journals or new delta journals.

Figure 5:
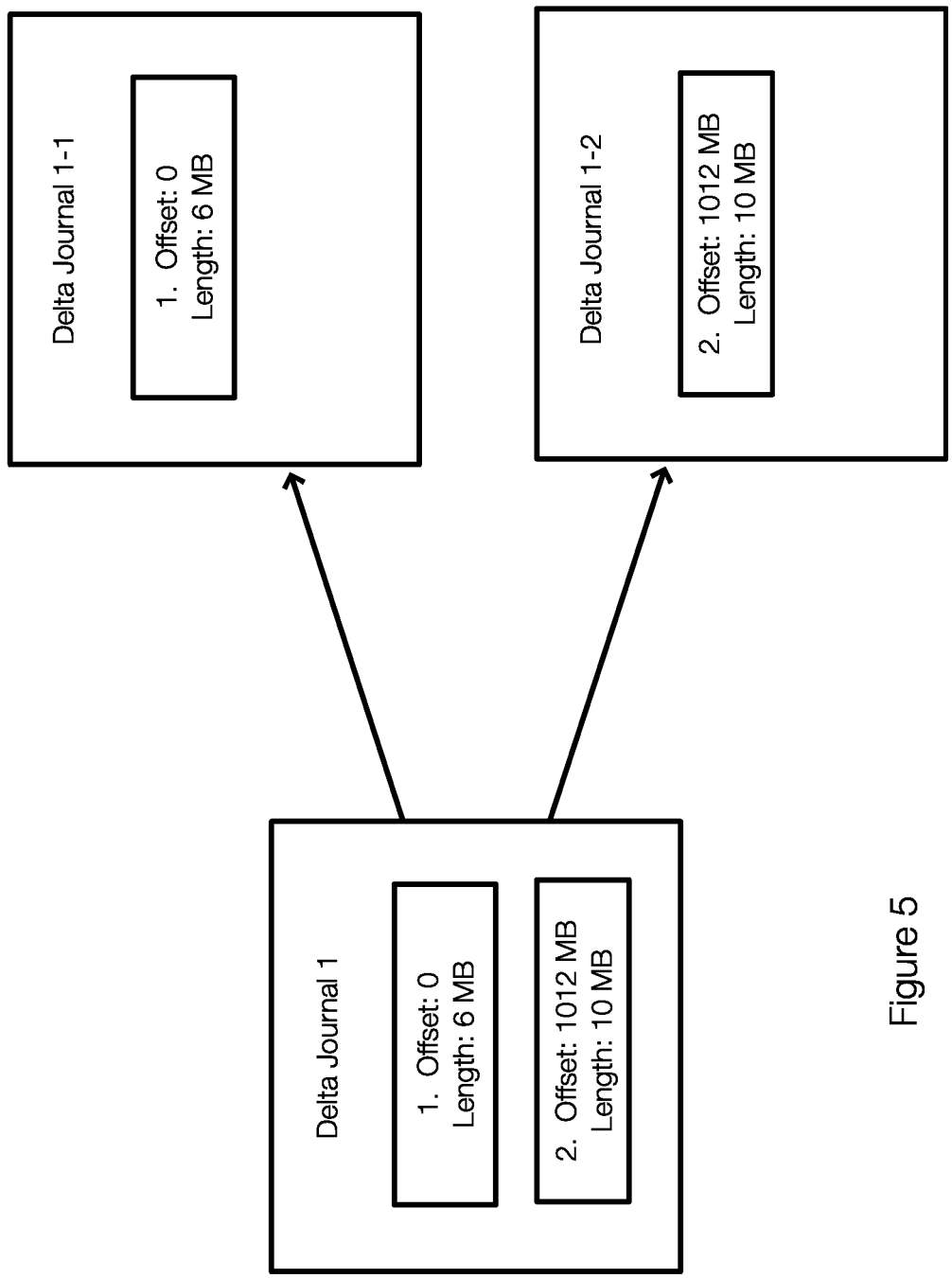
FIG. 5 illustrates and example of splitting a delta journal into offset or children delta journals.

FIG. 5 illustrates that the delta journal 1 is split into an offset delta journal 1-1 and a delta journal 1-2. The delta journal 1-1 is associated with all chunks having an offset of 0. The delta journal 1-2 is associated with all chunks having an offset of 1012 MB. The delta journal 2 is not split because the delta journal 2 only includes a single offset. Thus, the delta journal 1 is split based on offsets represented in the metadata of the delta journal 1.

Figure 6:
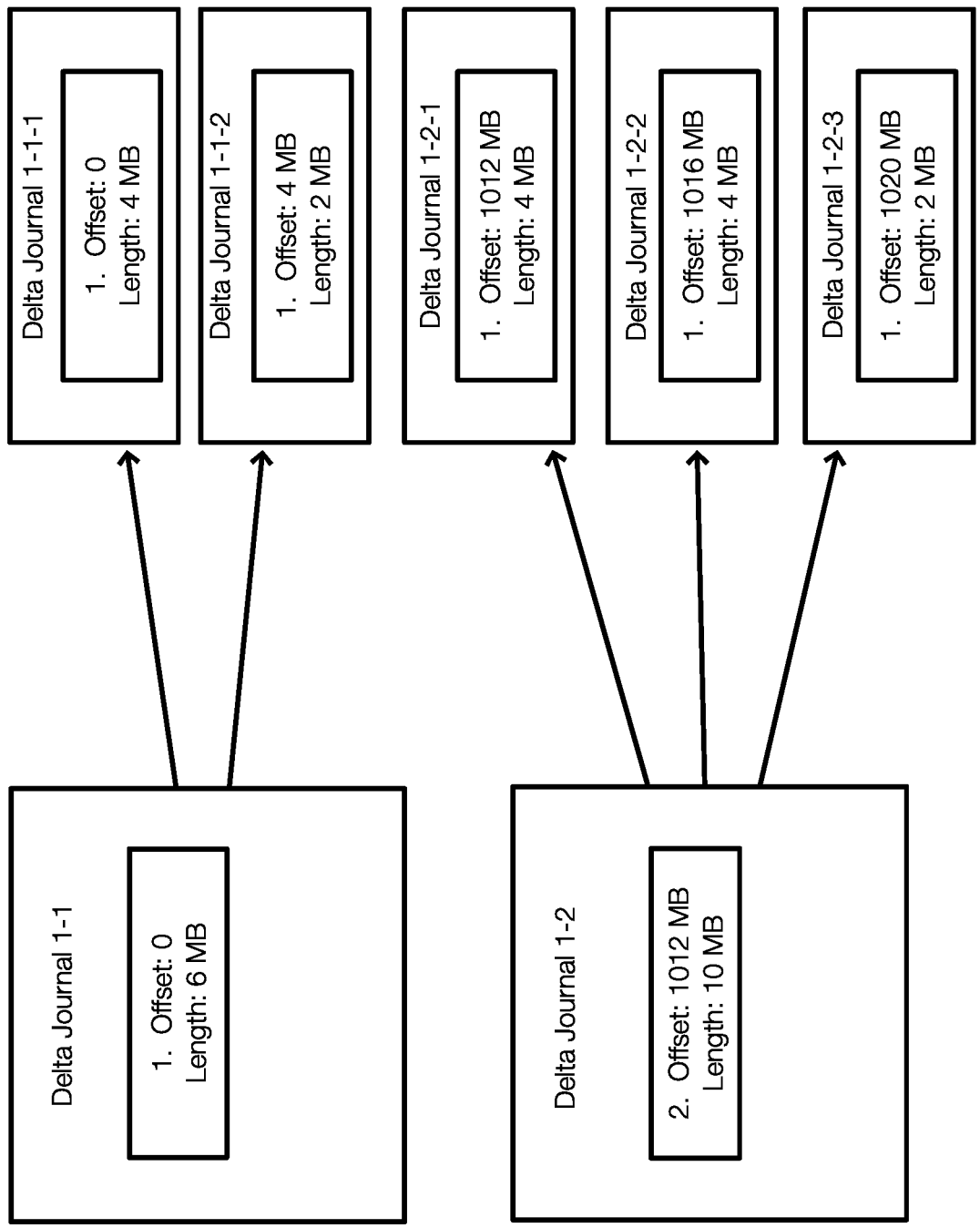
FIG. 6 illustrates an example of processing delta journals to associated chunks to segments.

FIG. 6 illustrates that the offset delta journals are further split based on segment index. With brief reference to FIG. 4, each of the segments 0 through N-1 may have a corresponding index: $S_0, S_1, \ldots S_{N-1}$ for a total of 256 indices. Each segment has a fixed size of 4 MB in this example. Thus, the offset delta journals are further split such that the objects in the delta journal are split according to the segment offsets or based on the segment index.

In this example, the delta journal 1-1 is split into offset delta journals 1-1-1 and 1-1-2. The delta journal 1-1-1 is associated with a segment having an offset of 0 or index 0 ($S_0$) and a length of 4 MB (the size of the segment). This allows the rest of the chunk represented by the delta journal 1-1 to be associated with the next segment index $S_1$. The delta journal 1-1-2 is associated with an object having an offset of 4 MB and a length of 2 MB. Similarly, the delta journal 1-2 is split into delta journals 1-2-1, 1-2-2, and 1-2-3. These are associated with offsets 1012, 1016, and 1020 or segment indexes $S_{253}$, $S_{254}$, and $S_{255}$.

Figure 7:
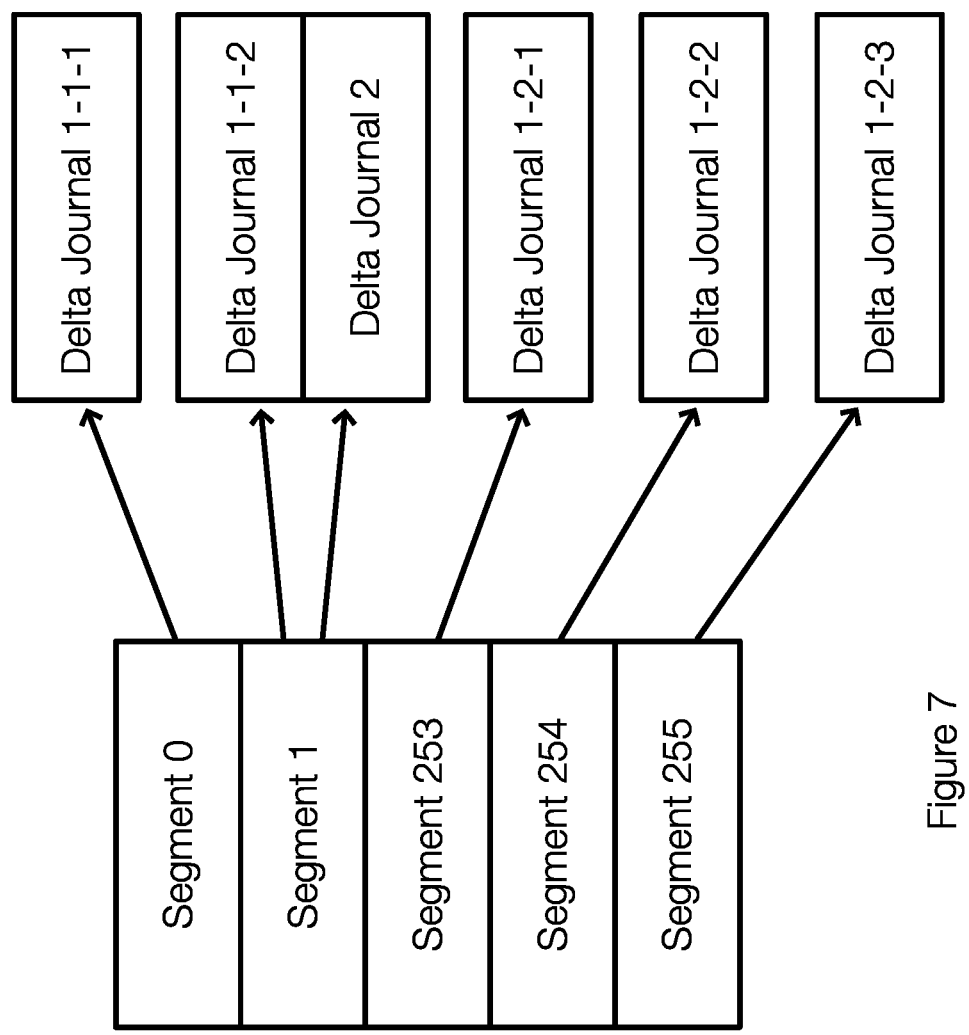
FIG. 7 illustrates relationships between segments and delta journals after the delta journals have been processed and are ready to be applied to the segments.

FIG. 7 illustrates that the delta journals may be grouped by segment index after the splitting procedures. In this example, segment index 0 (or offset 0) is associated with delta journal 1-1-1, segment index 1 is associated with 2 delta journals: delta journal 1-1-2 and delta journal 2. The segment indexes 253, 254, and 255 are associated with, respectively, the delta journals 1-2-1, 1-2-2 and 1-2-3.

This allows the segments at these indexes to be processed such that all chunks in the delta journals 1 and 2 that correspond to that segment to be applied at the same time. When segment having segment index 0 ($S_0$) is processed, the chunks from the delta journal 1-1-1 are acquired, applied to the segment $S_0$, and the segment $S_0$ is then written to the cloud storage. The chunk associated with the delta journal 1-1-1 could have alternatively been written to the segment $S_0$ in the cloud.

Similarly, when updating the segment $S_1$, the chunks in the delta journal 1-1-2 and the delta journal 2 are both applied to the segment $S_1$ at the same time. The other segments are similarly treated. In one example, for each segment index, the raw data chunks of the relevant delta journals are loaded and the segment raw data is updated with these chunks using, for example, a cloud API (Application Programming Interface). Once this process is complete, all of the delta journals can be deleted or removed from memory and from the cloud storage.

In one example, this process of FIG. 3 may include reads, which may incur cost. For example, assume that the delta journals have 1000 entries or objects and that there are multiple delta journals. If the length of the raw data in each entry is 1 KB, this may require the read API to be invoked 1000 times per delta journal. In some examples, embodiments of the invention are also able to reduce the number of reads using graphs.

Preprocessing the segments and the delta journals may include constructing a graph G. The following disclosure assumes that a subgraph is another graph formed from a subset of the vertices and edges of G. The vertex subset should include all endpoints of the edge subset, but may also include additional vertices. A connected component may be a subgraph of an undirected graph from which any two vertices are connected to each other by paths.

Initially, a graph is built or constructed. The graph may be built from the snapshot (the segments and chunks) uploaded to the cloud. For example, this process results in a graph G, which is an undirected graph with the following specifications.

Vertices(V): consist of copy segments (marked as $S_i$, i is segment index), and copy delta journals (marked as $D_j$, j is demand logs index). Each vertex is present as an object in cloud storage.

Edges(E):

$((D_j, S_i) | D_j$ has entry with off set and length that point to $S_i$, 0≤i<Number of segments, 0≤j<Number of demand logs)

In order to build the graph, the following procedures are performed:

Loop over the metadata of the delta journals and create nodes with delta journals index ($D_j$);

For each $D_1$, read the metadata, and loop over the entries and do:

Calculate to which segments indexes the offset and the length are pointing to; and Create segment nodes based on the result of 0, and for those nodes, create an edge which connect them to $D_j$; and Return G(V,E)

Figure 8:
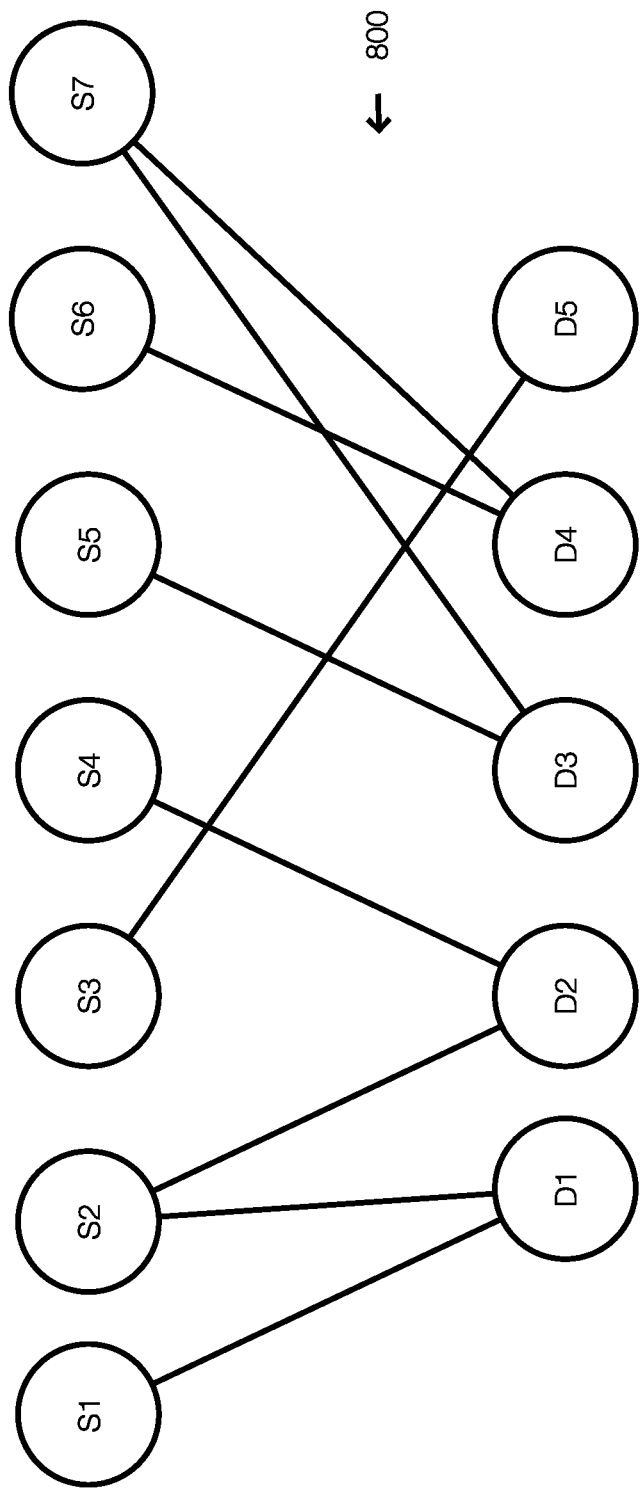
FIG. 8 illustrates an example of a graph.

FIG. 8 illustrates an example of a graph that is returned after following this procedure. The graph 800 represents relationships between the segments and the chunks or the delta journals. In this example, the segments correspond to nodes or vertices in the graph 800 and the delta journals also correspond to nodes or vertices. In this example, the delta journal D1 references segments S1 and S2. The delta journal D2 references segments S2 and S4. Other relationships are illustrated in the graph 800. The delta journal D5 is the only delta journal that references segment S3. The delta journal D5 does not reference any other segment.

Once the graph is formed, a connected component is determined. IN this example, the vertices are processed and a search algorithm is performed. A connected component is a set of vertices that have edges connecting them. By forming a graph to identify connected components (or connected segments/chunks, components that are unrelated can be processed in parallel without the concern of dependencies.

In order to calculate the connected component, we need to loop over the vertices and perform search algorithm, such as BFS (breadth first search), DFS (depth first search). The output is a list of connected components, where the intersection between any two connected components vertices is empty.

Figure 9:
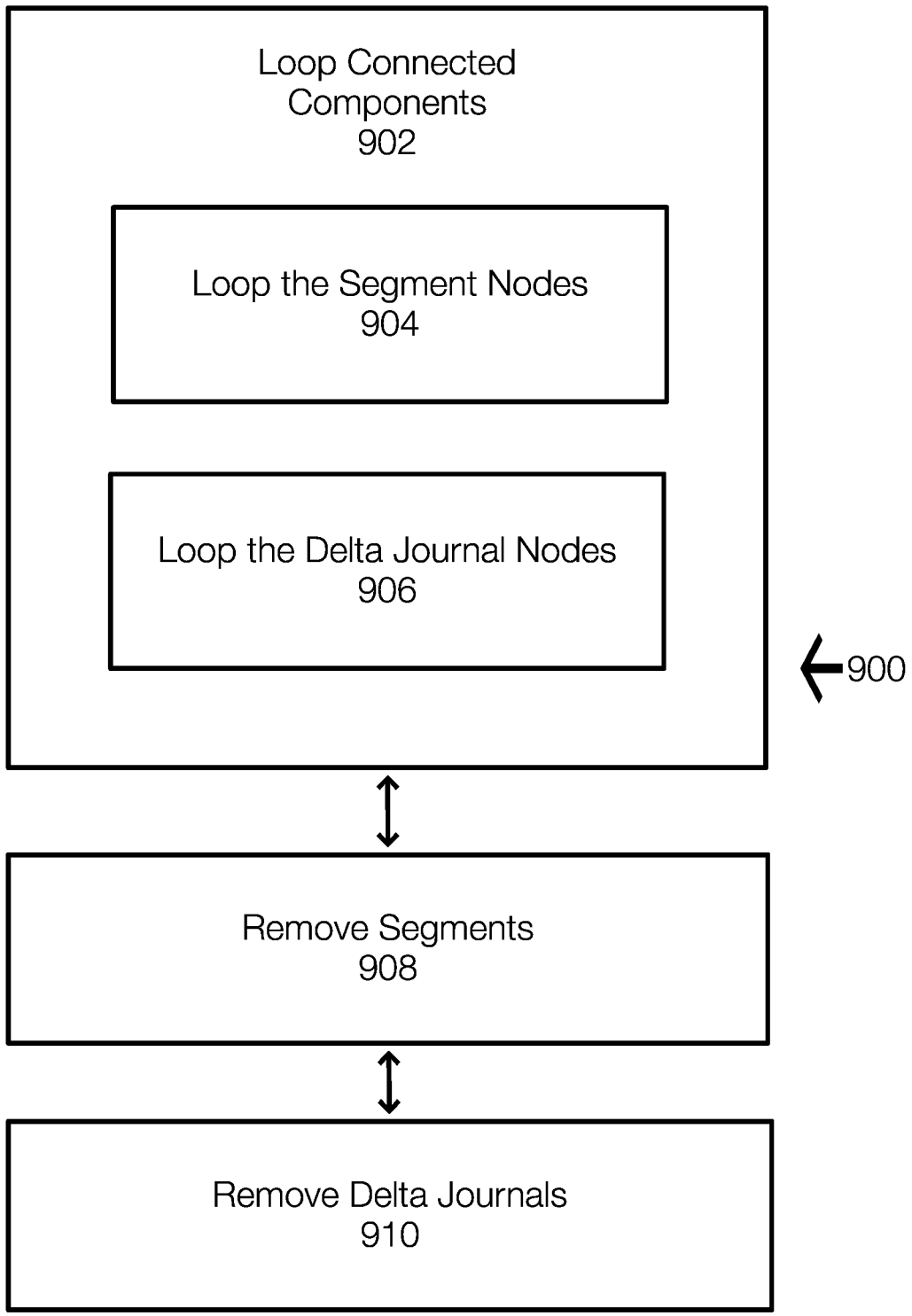
FIG. 9 illustrates and example of applying delta journals to segments based on a graph representation of the segments and delta journals.

After the connected components are determined, the following recovery operation is performed. FIG. 9 illustrates an example of a graph-based recovery operation or of an operation to prepare the segments for a recovery operation.

More specifically, FIG. 9 illustrates an example of a method for applying delta journals to segments. After forming the graph, the connected components are looped 902 or processed. Looping 902 the connected components may include looping 904 the segment nodes and looping 906 the delta journal nodes in the graph.

More specifically, looping 904 the segment nodes includes downloading the data of the segments and persisting the segment data into a map in memory. The key to the map may be the segment index and the value is the raw data. Looping 906 the demand nodes may include downloading the chunks and persisting the chunks as a list, which may be a chunk list.

Next, the entries or chunks in the delta journal are processed. For example, the offset and length of an entry i is read and the segment indexes are determined based on the offset and length of the chunks in the delta journals. For example, for a chunk of 6 MB (assuming a segment size of 4 MB), the analysis would identify at least two segment indexes as previously described for that chunk. Each delta journal or node may contain more than one chunk or object.

Once the indexes are determined, the segments are overridden or overwritten with the chunks. Once all of the entries in the delta journals or in the delta journal nodes are completed, the segments are removed 908. Removing the segments may include uploading the segment back to the cloud and then removing the entry from the segment map in memory. Finally, the delta journals are removed 910 from the cloud and/or the memory.

One advantage of the method 900 is that the handling of objects (e.g., segments and/or chunks and/or metadata) is split to multiple sub-groups. These sub-groups are typically smaller and are more easily accommodated in a memory.

Each connected component can be processed independent by the restore VM and fit into the memory of the restore VM. As a result, each object will be read/written only once to object storage, which eliminates multiple reads and the cost of those reads.

In one example, a connected component may not fit in memory due to the size of the connected component. This can be determined when the graph is constructed. In this case, one of the embodiments previously described can be applied to at least a part of the graph.

The methods described herein may be combined in parts. For example, splitting the delta journals at step 304 and 306 can be implemented using a graph as described herein. As a result, the methods disclosed herein can be combined in different manners.

Figure 10:
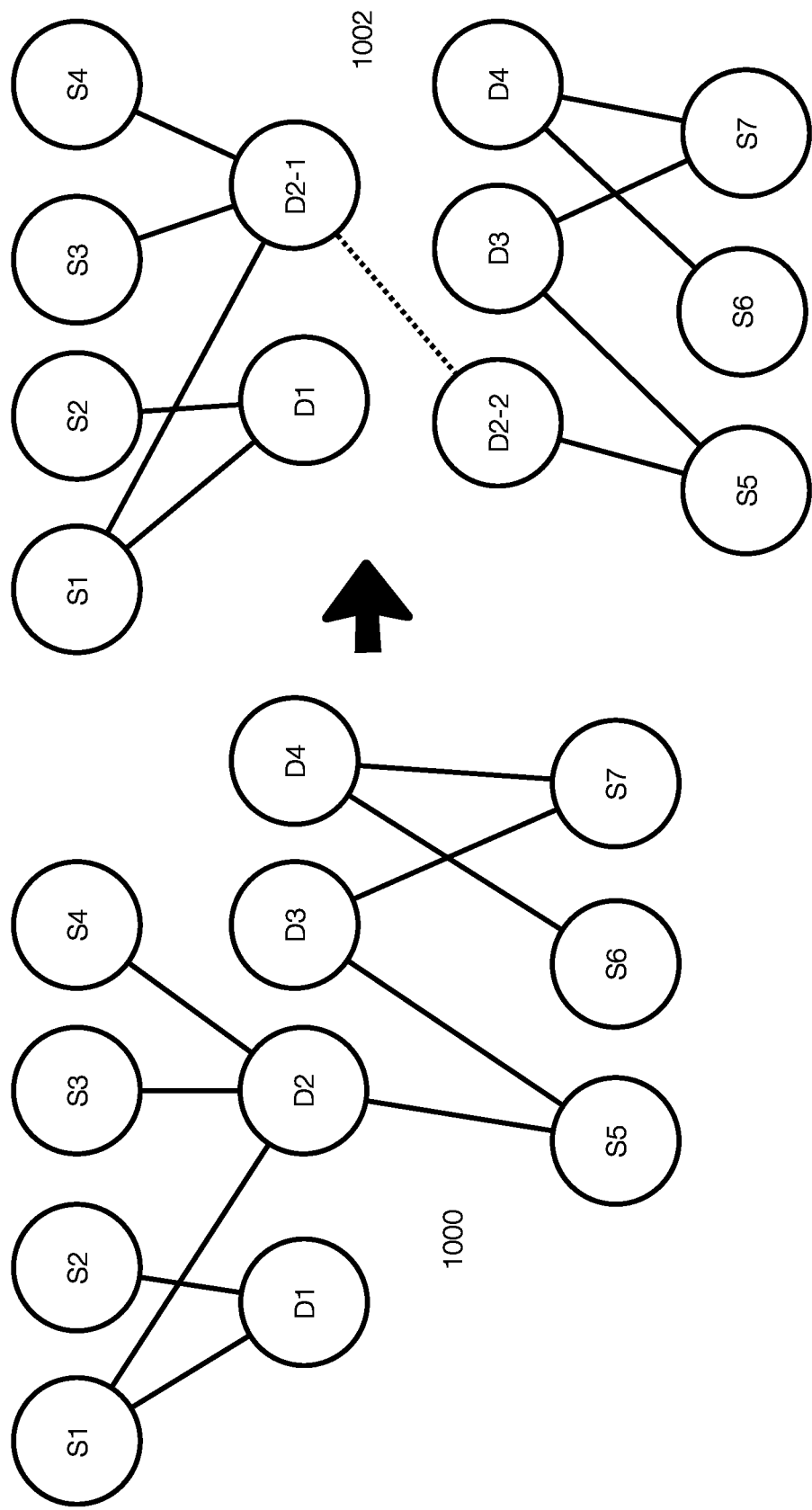
FIG. 10 illustrates an example of a graph that is divided into subgraphs that can each be processed as a separate graph.

In another example, the graph may be separated into sub-components. FIG. 10 illustrates an example of a graph that is split or separated into sub-components that can be handled separately and/or independently. FIG. 10 illustrates a graph 1000 that is entirely connected. However, the node D2 is a node or object that connects two sub-graphs, As a result, the node D2, which includes or is a delta journal, can be replaced with two delta journals as illustrated in graphs 1002: delta journal D2-1 and D2-2.

The delta journal D2-1 contains the references to S1-S4 and the delta journal D2-2 contains the remaining reference to S5. This separates the single connected component cleanly into two components:

Performing an analysis of a connected component to detect the minimal changes needed is equivalent to finding a Minimum Vertex Cut in graph theory as known. Once this operation is completed, the resulting connected components can be handled as discussed herein. Thus, each of the subgraphs 1000 and 1002 can each reside in the memory of the VM processing the graphs.

In one example, once pre-processing is completed and there are no delta journals, and the segments now contain the relevant data for the point-in-time, the recovery process may proceed as follows.

The data protection system will trigger a disaster recovery operation to create a virtual machine from a specific copy or point in time backup. A restore VM is then deployed. The restore VM downloads all of the segments in sequence and writes the segments to the relevant disk.

Embodiments of the invention advantageously improve RTO The suggested by applying the delta journals to the relevant segments in the cloud. This is typically performed in the event that a disaster recovery operation may be needed in the future. Thus, RTO (for the recovery operation) is improved because the segments are downloaded. The delta journals do not need to be downloaded because they were previously applied and have been deleted (thus saving on storage costs). RTO is further reduced at leave because the time associated with writing delta journals to the VM being recovered is eliminated.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. Such operations may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way Embodiment 1. A method, comprising: loading metadata associated with a delta journal stored in cloud storage, wherein the delta journal and segments are associated with a backup that corresponds to a point in time, process the delta journal to create new delta journals that are based on offsets and segment indexes of chunks included in the delta journal, group the new delta journals based on the segment indexes, overwrite the segments based on the new delta journals such that all chunks associated with a particular segment are applied at the same time.

Embodiment 2. The method of embodiment 1, further comprising removing the delta journal from storage.

Embodiment 3. The method of embodiment 1 and/or 2, further comprising generating a graph from the segments and the delta journal associated with the backup.

Embodiment 4. The method of embodiment 1, 2, and/or 3, further comprising looping the segments and looping the delta journals.

Embodiment 5. The method of embodiment 1, 2, 3, and/or 4, wherein looping the segments includes persisting data of the segments in memory and wherein looping the delta journals includes downloading chunks identified in the delta journals, persisting the chunks in the memory, and determining segment indices for the chunks.

Embodiment 6. The method of embodiment 1, 2, 3, 4, and/or 5, wherein some of the chunks are associated with more than one index.

Embodiment 7. The method of embodiment 1, 2, 3, 4, 5, and/or 6, further comprising applying the chunks to the segments in memory and storing the segments in the cloud storage.

Embodiment 8. The method of embodiment 1, 2, 3, 4, 5, 6, and/or 7, further comprising removing the delta journal from the cloud storage.

Embodiment 9. The method of embodiment 1, 2, 3, 4, 5, 6, 7, and/or 8, wherein the backup corresponds to a point-in-time after the delta journals are applied to the segments.

Embodiment 10. The method of embodiment 1, 2, 3, 4, 5, 6, 7, 8, and/or 9, further comprising performing a snapshot to obtain the backup.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11 or portions thereof.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and the disclosure and/or elsewhere herein, may take the form of, or include, or be implemented on, or hosted by, a physical computing device, one example of which is denoted at. As well, where any of the aforementioned elements comprise or consist of a virtual machine (VM), that VM may constitute a virtualization of any combination of the physical components disclosed herein.

In the example of, the physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid-state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein including, but not limited to data protection operations disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

What is claimed is:

1. A method, comprising:
    generating a backup of data for a point in time based on a bitmap, wherein each entry in the bitmap corresponds to a segment of the data and each marked bit corresponds to a segment that has changed in the data, wherein each segment has a fixed size, by:
        performing a synchronization process by reading segments of the data corresponding to the marked bits; and
        during the synchronization process, generating a delta journal, wherein the delta journal includes chunks corresponding to data overwritten by writes applied to segments that are yet to be synchronized by the synchronization process, wherein each chunk has an unfixed size;
    loading metadata associated with the delta journal stored in cloud storage, wherein the delta journal and segments are associated with the backup that corresponds to the point in time;
    processing the delta journal to create new delta journals that are based on offsets and segment indexes of the chunks included in the delta journal;
    grouping the new delta journals based on the segment indexes;

overwriting the segments based on the new delta journals such that first chunks included in the chunks and associated with a particular segment are applied at the same time.

2. The method of claim 1, further comprising removing the delta journal from storage.

3. The method of claim 1, further comprising generating a graph from the segments and the delta journal associated with the backup.

4. The method of claim 3, further comprising looping the segments and looping the new delta journals.

5. The method of claim 4, wherein looping the segments includes persisting data of the segments in memory and wherein looping the new delta journals includes downloading the chunks identified in the new delta journals, persisting the chunks in the memory, and determining segment indices for the chunks.

6. The method of claim 5, wherein some of the chunks are associated with more than one index.

7. The method of claim 5, further comprising applying the chunks to the segments in memory and storing the segments in the cloud storage.

8. The method of claim 3, further comprising performing a snapshot to obtain the backup.

9. The method of claim 1, further comprising removing the delta journal from the cloud storage.

10. The method of claim 1, wherein the backup corresponds to a point-in-time after the new delta journals are applied to the segments.

11. A non-transitory storage medium having stored therein instructions that are executable by one or more hardware processors to perform operations comprising:
generating a backup of data for a point in time based on a bitmap, wherein each entry in the bitmap corresponds to a segment of the data and each marked bit corresponds to a segment that has changed in the data, wherein each segment has a fixed size, by:
performing a synchronization process by reading segments of the data corresponding to the marked bits; and
during the synchronization process, generating a delta journal, wherein the delta journal includes chunks corresponding to data overwritten by writes applied to segments that are yet to be synchronized by the synchronization process, wherein each chunk has an unfixed size;
loading metadata associated with the delta journal stored in cloud storage, wherein the delta journal and segments are associated with the backup that corresponds to the point in time;
processing the delta journal to create new delta journals that are based on offsets and segment indexes of the chunks included in the delta journal;
grouping the new delta journals based on the segment indexes;
overwriting the segments based on the new delta journals such that first chunks included in the chunks and associated with a particular segment are applied at the same time.

12. The non-transitory storage medium of claim 11, the operations further comprising removing the delta journal from storage.

13. The non-transitory storage medium of claim 11, the operations further comprising generating a graph from the segments and the delta journal associated with the backup.

14. The non-transitory storage medium of claim 13, the operations further comprising looping the segments and looping the new delta journals.

15. The non-transitory storage medium of claim 14, wherein looping the segments includes persisting data of the segments in memory and wherein looping the new delta journals includes downloading the chunks identified in the new delta journals, persisting the chunks in the memory, and determining segment indices for the chunks.

16. The non-transitory storage medium of claim 15, wherein some of the chunks are associated with more than one index.

17. The non-transitory storage medium of claim 15, further comprising applying the chunks to the segments in memory and storing the segments in the cloud storage.

18. The non-transitory storage medium of claim 13, the operations further comprising performing a snapshot to obtain the backup.

19. The non-transitory storage medium of claim 11, the operations further comprising removing the delta journal from the cloud storage.

20. The non-transitory storage medium of claim 11, wherein the backup corresponds to a point-in-time after the new delta journals are applied to the segments.

* * * * *